United States Patent
Cartwright

[19]

[11] Patent Number: 6,019,012
[45] Date of Patent: Feb. 1, 2000

[54] LASH ADJUSTMENT MECHANISM

[75] Inventor: Mark A. Cartwright, West Lafayette, Ind.

[73] Assignee: TRW Inc., Lyndhurst, Ohio

[21] Appl. No.: 09/159,899

[22] Filed: Sep. 24, 1998

[51] Int. Cl.$^7$ .............................. F16H 55/18; B62D 3/12
[52] U.S. Cl. ................... 74/409; 74/402; 74/498
[58] Field of Search .......................... 74/398, 402, 409, 74/498; 188/196 F

[56] References Cited

U.S. PATENT DOCUMENTS

| | | |
|---|---|---|
| 2,984,121 | 5/1961 | Folkerts . |
| 3,252,348 | 5/1966 | Folkerts . |
| 3,600,965 | 8/1971 | Folkerts . |
| 3,884,091 | 5/1975 | Hay . |
| 5,392,666 | 2/1995 | Lin . |
| 5,906,133 | 5/1999 | Gilbert ...................................... 74/409 |

OTHER PUBLICATIONS

Co–pending U.S. Pat. appln. Ser. No. 08/905,172, filed Aug. 1, 1997, entitled "Lash Adjustment Assembly".

*Primary Examiner*—Allan D. Herrmann
*Attorney, Agent, or Firm*—Tarolli, Sundheim, Covell, Tummino & Szabo L.L.P.

[57] ABSTRACT

An apparatus for use in turning steerable wheels of a vehicle includes a first gear (16) and a second gear (14). The first gear (16) is movable along an axis (24) to reduce clearance between meshing teeth (18 and 20) on the gears (14 and 16). A lash adjustment assembly (46) is operable to adjust the clearance between the teeth (18 and 20) of the gears (14 and 16). The lash adjustment assembly (46) includes a threaded member (60). An external thread convolution (66) on a shank portion (64) of the threaded member (60) engages an internal thread convolution (68) on the first gear (16). A spring (72) has a plurality of turns (78) which are coiled around the shank portion (64) of the threaded member (60). One end portion of the spring (72) is connected to the shank portion (64) of the externally threaded force member (60). The opposite end portion (74) of the spring (72) is movable between an active condition in which it is effective to transmit force to a housing (30) and an inactive condition in which it is effective to transmit force to the threaded member (60).

12 Claims, 3 Drawing Sheets

LASH ADJUSTMENT MECHANISM

BACKGROUND OF THE INVENTION

The present invention relates to a lash adjustment assembly which is effective to reduce clearance between teeth of gears in a vehicle steering apparatus.

A known lash adjustment assembly, disclosed in U.S. Pat. No. 3,884,091, is used in a vehicle steering apparatus. This known lash adjustment assembly is operable to move a first gear along a first axis to reduce clearance between teeth of the first gear and a second gear. A shaft connected with the first gear rotatably supports a pair of cams. A cam locking device is connected to the cams to permit axial adjustment between the gears only when the steering apparatus is centered.

Another known lash adjustment assembly is disclosed in U.S. patent application Ser. No. 08/905,172 filed Aug. 1, 1997 by Wendell L. Gilbert and entitled "Lash Adjustment Assembly". This application discloses a lash adjustment assembly which is operable to adjust clearance between gears in a vehicle steering apparatus when an engine of the vehicle is in a non-operational condition and the steering apparatus of the vehicle is in an on-center or initial condition. The lash adjustment assembly includes a threaded force transmitting member and a spring which causes relative rotation between the threaded force transmitting member and the first gear to move the first gear relative to the second gear to adjust the clearance between the gears. Other known lash adjustment assemblies are disclosed in U.S. Pat. Nos. 3,252,348 and 3,600,965.

SUMMARY OF THE INVENTION

The present invention provides a new and improved apparatus for use in turning steerable wheels of a vehicle. The apparatus includes a first gear which is rotatable about a first axis and a second gear having teeth in meshing engagement with teeth on the first gear. A lash adjustment assembly is provided to move the first gear along the first axis to reduce clearance between teeth of the gears. Upon turning of steerable vehicle wheels, the lash adjustment assembly is rendered ineffective to reduce clearance between teeth of the gears.

The lash adjustment assembly includes a threaded member which is connected with the first gear. A spring is provided to rotate the threaded member. The spring has a first end which is connected with the threaded member and a second end. The second end of the spring is movable between an active condition and an inactive condition.

When the second end of the spring is in the active condition, the spring is effective to urge the threaded member to rotate relative to the first gear. When the second end of the spring is in the inactive condition, the second end of the spring is effective to transmit force to the threaded member. When both ends of the spring transmit force to the threaded member, the spring is ineffective to urge the threaded member to rotate relative to the first gear. An actuator engages the second end of the spring to effect movement of the spring from the active condition to the inactive condition upon turning of the steerable vehicle wheels.

Although it is contemplated that the threaded member could have many different constructions, the threaded member may have a head end portion and a shank which extends from the head end portion and is threaded. The head end portion of the threaded member may have a plurality of recesses which are engaged by the second end of the spring when the spring is in the inactive condition. The spring may have a plurality of turns which are coiled around the shank of the threaded member.

BRIEF DESCRIPTION OF THE DRAWINGS

The foregoing and other features of the present invention will become more apparent to one skilled in the art to which the present invention relates upon consideration of the following description of the invention with reference to the accompanying drawings, wherein.

DESCRIPTION OF A SPECIFIC PREFERRED EMBODIMENT OF THE INVENTION

Figure 1:
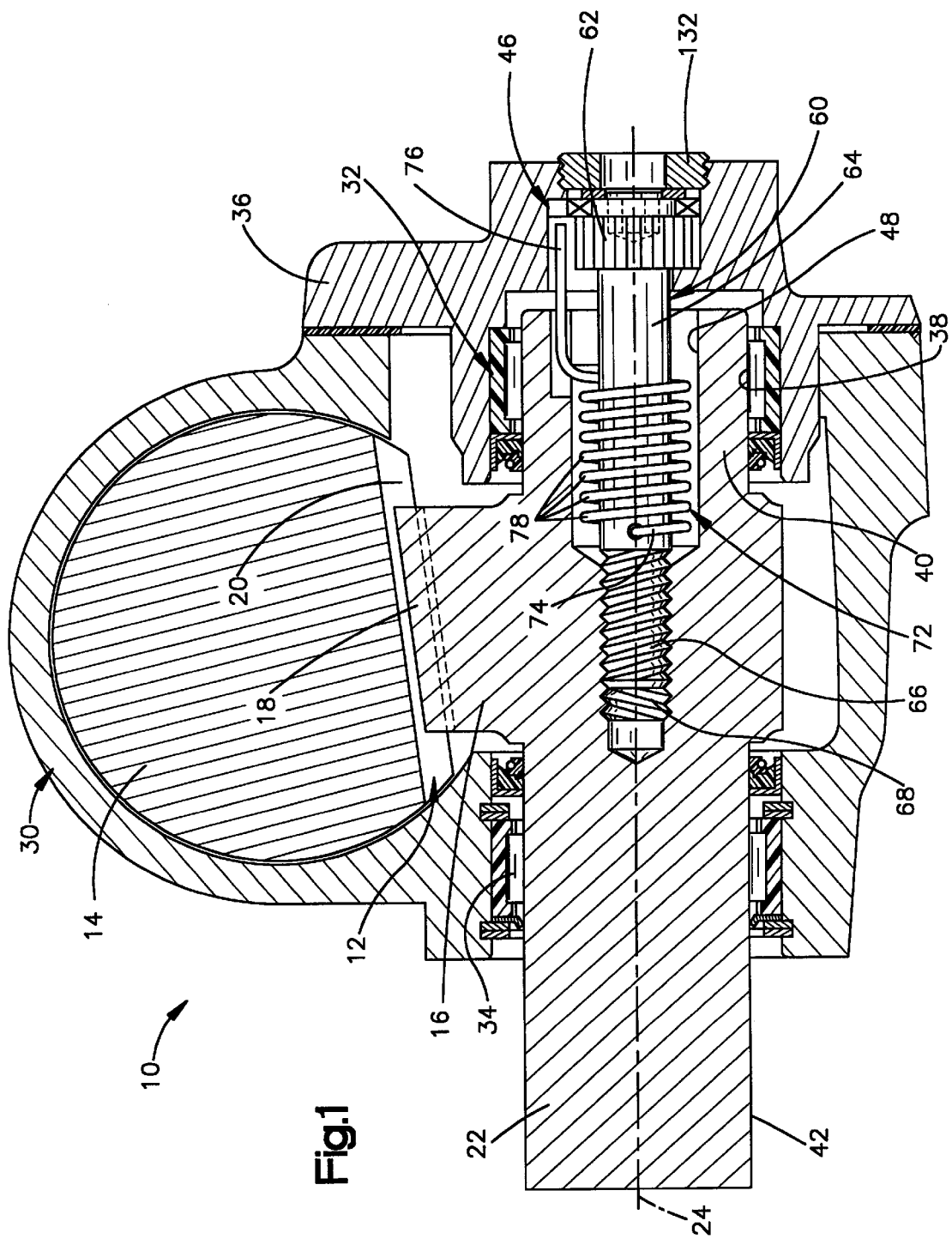
FIG. 1 is a fragmentary sectional view of an apparatus constructed in accordance with the present invention for use in turning steerable wheels of a vehicle.

An apparatus 10 (FIG. 1) for use in turning steerable wheels of a vehicle having an engine includes a gear set 12 which is actuatable by a power steering motor (not shown). A pump (not shown) provides pressurized fluid to the power steering motor. The gear set 12 includes a rack gear 14 connected with a piston of the power steering motor. The gear set 12 also includes a sector gear 16 which has teeth 18 disposed in engagement with teeth 20 on the rack gear 14. The sector gear 16 has an output shaft 22 which is connected with a pitman arm (not shown) of a steering linkage. The sector gear 16 is rotatable about an axis 24.

The rack and sector gears 14 and 16 are enclosed by a metal housing 30. The sector gear 16 is supported for rotation about the axis 24 by an inner bearing assembly 32 and an outer bearing assembly 34. The inner bearing assembly 32 is mounted on a metal end wall 36 of the housing 30. The inner bearing assembly 32 engages a cylindrical outer side surface 38 on an end portion 40 of the sector gear 16. The outer bearing assembly 34 engages a cylindrical outer side surface 42 on the output shaft 22.

The general construction of the rack gear 14 and the sector gear 16 and the manner in which they cooperate with a power steering motor is the same as is disclosed in U.S. Pat. Nos. 3,741,074 and 4,164,892. However, the rack and sector gears 14 and 16 could have a different construction and could be associated with a different type of power steering motor if desired.

A lash adjustment assembly 46 (FIG. 1), constructed in accordance with the present invention, is provided in a bore 48 in the sector gear 16 to compensate for gear tooth wear. The lash adjustment assembly 46 compensates for gear tooth wear by reducing clearance between the teeth 18 and 20 on the sector gear 16 and rack gear 14.

The lash adjustment assembly 46 is effective to reduce the clearance between the teeth 18 and 20 on the sector gear 16 and rack gear 14 when the steering apparatus 10 is in an on-center or initial condition. When the steering apparatus 10 is in an on-center condition, the steerable vehicle wheels (not shown) are in a straight-ahead orientation. When the steerable vehicle wheels are in a straight-ahead orientation, there is minimal loading between the sector gear teeth 18 and the rack gear teeth 20.

When the apparatus 10 is in an on-center or initial condition, the lash adjustment assembly 46 is effective to reduce clearance between the sector gear teeth 18 and rack gear teeth 20. When the vehicle wheels are turned, the lash adjustment assembly 46 is not effective to reduce the clearance between the sector gear teeth 18 and the rack gear teeth 20. However, as soon as the steering apparatus 10 is operated back to the initial or on-center condition, the lash adjustment assembly 46 is again effective to move the sector gear 16 along its axis 24 to reduce clearance between the sector gear teeth 18 and the rack gear teeth 20.

The lash adjustment assembly 46 includes a metal threaded force transmitting member 60 (FIG. 2) which transmits force between the end wall 36 of the housing 30 and the sector gear 16 to move the sector gear along the axis 24. The threaded force transmitting member 60 has a head end portion 62 and a shank portion 64. The shank portion 64 is integrally formed as one piece with the head end portion 62 and extends axially outward from the head end portion. The head end portion 62 and shank portion 64 have central axes which are coincident with the axis 24 about which the sector gear 16 rotates upon turning of the steerable vehicle wheels.

An external thread convolution 66 on the shank portion 64 of the threaded force transmitting member 60 engages an internal thread convolution 68 formed in the sector gear 16. The external and internal thread convolutions 66 and 68 and the threaded force transmitting member 60 have central axes which are coincident with the axis 24.

In accordance with one of the features of the present invention, a metal torsion spring 72 urges the threaded force transmitting member 60 to rotate relative to the sector gear 16. The spring 72 has a first end portion 74 which is connected with the shank portion 64 of the threaded force transmitting member 60. The torsion spring 72 has a second end portion 76 which is disposed adjacent to the head end portion 62 of the threaded force transmitting member 60.

In addition, the torsion spring 72 has a plurality of circular turns 78 which are disposed between the end portions 74 and 76 of the spring. The turns 78 in the spring 72 have a circular configuration and are coiled in a helix about the shank portion 64 of the threaded force transmitting member 60. The helix formed by the turns of the spring 72 has a central axis which is coincident with the axis 24.

Figure 2:
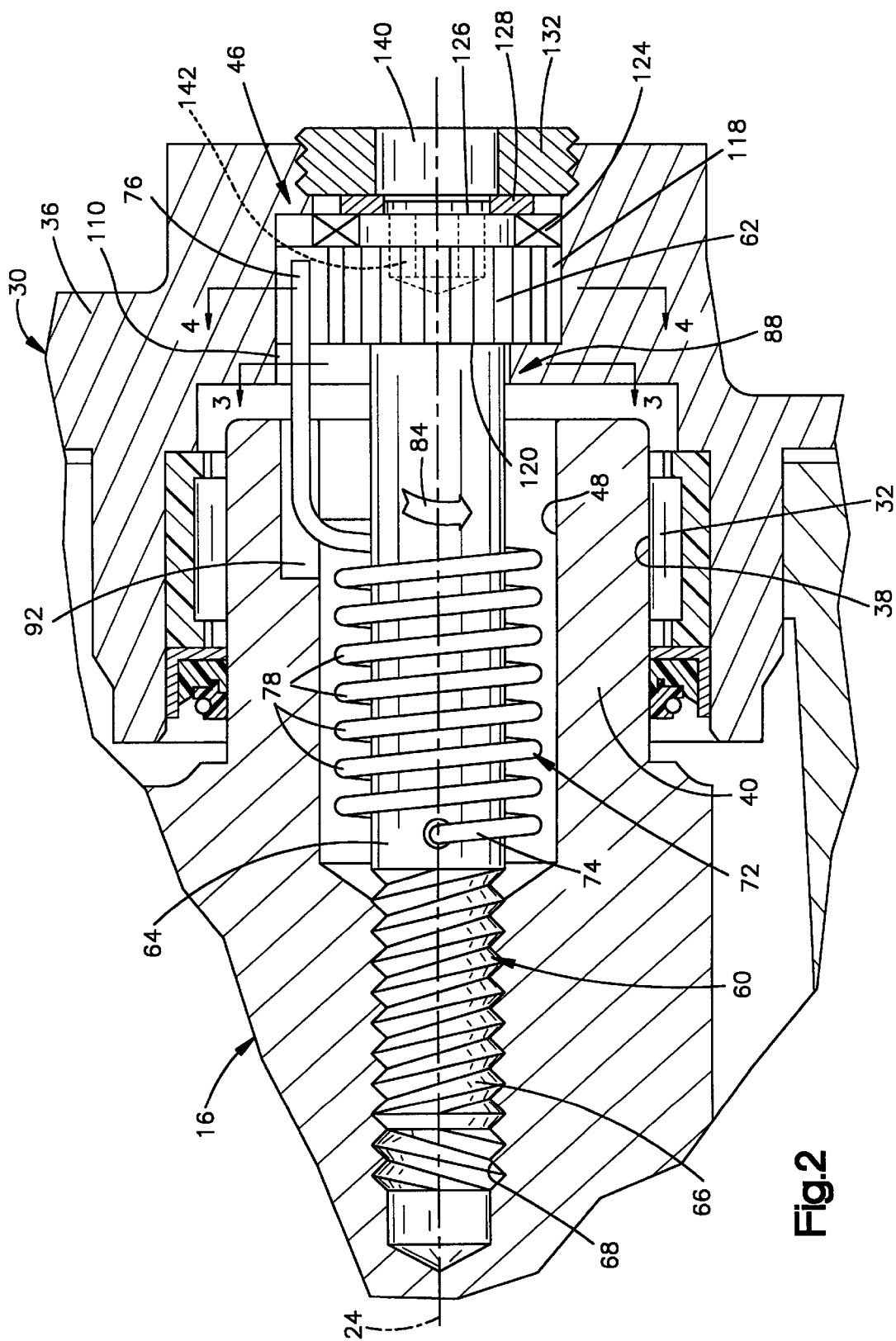
FIG. 2 is an enlarged fragmentary view of a lash adjustment assembly which forms a portion of the apparatus of FIG. 1.

When the steerable vehicle wheels are in a straight-ahead or on-center initial condition, the resiliently deflected turns 78 of the torsion spring 72 urge the threaded force transmitting member 60 to rotate in the direction of the arrow 84 in FIG. 2. The force supplied by the spring 72 is transmitted through the external thread convolution 66 to the internal thread convolution 68. The force applied against the internal thread convolution 68 by the external thread convolution 66 on the shank portion 64 of the threaded force transmitting member 60 urges the sector gear 16 toward the left (as viewed in FIG. 1). This force presses the teeth 18 on the sector gear 16 firmly against the teeth 20 on the rack gear 14. Therefore, clearance between the teeth of the sector gear 16 and rack gear 14 is eliminated to thereby eliminate any backlash between the gears.

In accordance with one of the features of the invention, an actuator 88 (FIG. 3) actuates the torsion spring 72 from an active condition in which the spring is effective to urge the threaded force transmitting member 60 to rotate relative to the sector gear 16 (FIG. 2) and an inactive condition in which the spring is ineffective to provide force to urge the threaded force transmitting member 60 to rotate relative to the sector gear. When the spring 72 is in the active condition illustrated in FIGS. 1, 2 and 3, the second end portion 76 of the spring is spaced from the threaded force transmitting member 60 and engages the actuator 88. At this time, the spring 72 is effective to transmit force between the end wall 36 of the housing 30 (FIG. 2) and the threaded force transmitting member 60.

Upon initiation of turning of the steerable vehicle wheels, the sector gear 16 begins to rotate. The second end portion 76 of the spring 72 extends into a slot 92 (FIG. 2) formed in the sector gear 16 and rotates with the sector gear about the axis 24. This results in movement of the second end portion 76 of the spring 72 relative to a cam surface 96 in the actuator 88. As the second end portion 76 of the spring 72 moves relative to the cam surface 96, the cam surface resiliently deflects the second end portion of the spring from the active position shown in solid lines in FIG. 4 to the inactive position shown in dashed lines in FIG. 4.

Figure 4:
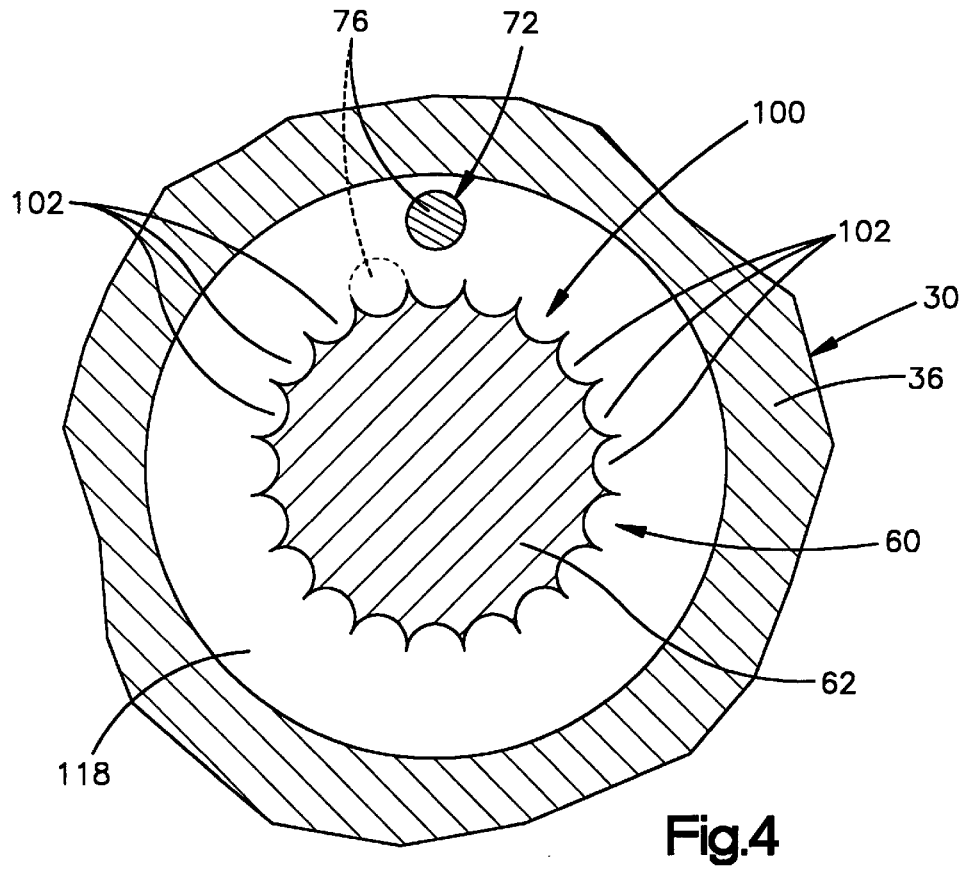
FIG. 4 is an enlarged sectional view, taken generally along the line 4—4 of FIG. 2, illustrating the manner in which an end portion of the spring is moved into engagement with a recess in the head portion of the threaded member in the lash adjustment assembly by the actuator of FIG. 3 upon turning of the steerable vehicle wheels.

As the second end portion 76 of the spring 72 is deflected by the actuator cam surface 96, the second end portion 76 of the spring 72 moves into engagement with a circular array 100 of recesses 102 formed in the threaded force transmitting member 60 (FIG. 4). This results in the first end portion 74 and the second end portion 76 of the spring 72 both being disposed in engagement with the threaded force transmitting member 60.

When the first and second end portions 74 and 76 of the spring 72 are both disposed in engagement with the threaded force transmitting member 60, the spring is ineffective to urge the force transmitting member to rotate relative to the sector gear 16. Therefore, during turning movement of the steerable vehicle wheels, the lash adjustment assembly 46 is ineffective to apply force to the sector gear 16 to eliminate clearance between the teeth 18 of the sector gear and the teeth 20 of the rack gear 14.

As the steerable vehicle wheels are moved back toward the on-center or straight-ahead initial condition, the second end portion 76 of the spring 72 resiliently moves outward away from the array 100 of recesses 102 in the threaded force transmitting member 60. Upon disengagement of the second end portion 76 of the spring 72 from the array 100 of recesses 102, the spring is again effective to transmit force between the threaded force transmitting member 60 and the housing 30 to urge the force transmitting member to rotate in the direction indicated by the arrow 84 in FIG. 2 relative to the sector gear 16. Therefore, when the steerable vehicle wheels are moved back to the on-center condition in which the vehicle is proceeding straight ahead, the lash adjustment assembly 46 is again effective to apply force to the sector gear 16 urging the sector gear toward the left (as viewed in FIG. 1) along the axis 24 to eliminate backlash between the sector gear and the rack gear 14.

In the embodiment of the invention illustrated in FIGS. 1–4, the actuator 88 is integrally formed as one piece with the end wall 36 of the housing 30. The cam surface 96 of the actuator 88 defines a recess 110 in which the second end portion 76 of the spring is disposed when the spring 72 is in the active condition. At this time, the vehicle is proceeding straight ahead with the steerable wheels in an on-center condition.

Upon initiation of turning of the steerable vehicle wheels, the sector gear 16 is rotated relative to the housing 30 about the axis 24. As this occurs, the second end portion 76 of the spring moves along the cam surface 96 and out of the recess 110. The second end portion 76 of the spring then moves into engages one of a pair of cam surface dwell sections 112 or 114 extending from opposite sides of the recess 110. As this occurs, the second end portion 76 of the spring 72 moves into one of the recesses 102 and the spring is actuated from the active condition to the inactive condition.

If the sector gear 16 is rotated so as to move the second end portion 76 of the spring 72 in a counterclockwise direction (as viewed in FIG. 3) about the axis 24 (FIG. 1) of the sector gear, the second end portion (FIG. 3) of the spring moves out of the recess 110 into engagement with the dwell section 112 of the cam surface 96. As this occurs, the second end portion 76 of the spring 72 is resiliently deflected. The second end portion 76 of the spring 72 is deflected into engagement with one of the recesses 102 in the array 100 of recesses, in the manner indicated in dashed lines in FIG. 4.

Figure 3:
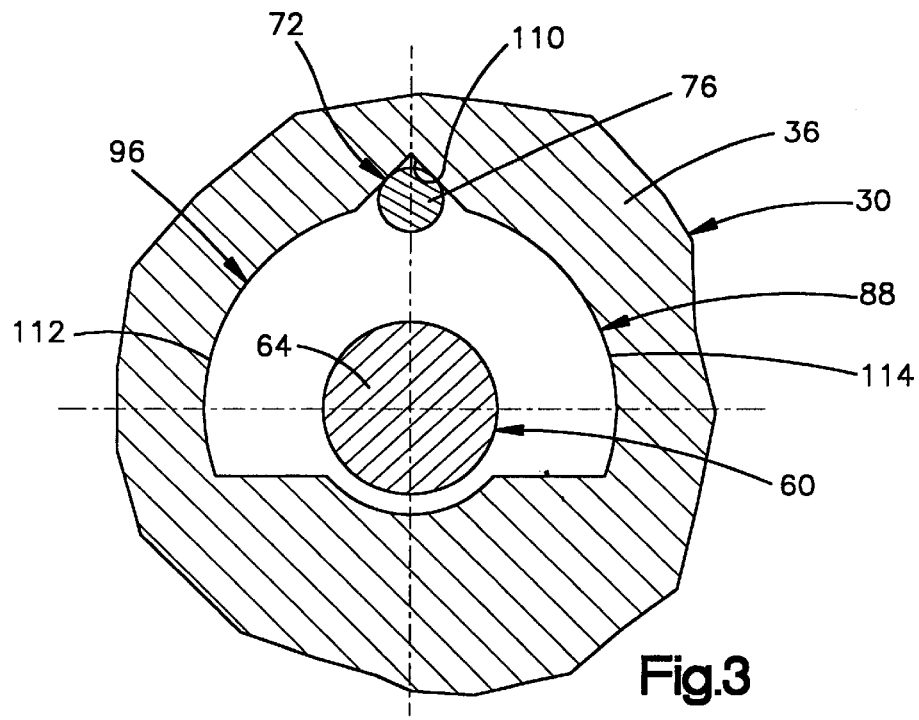
FIG. 3 is a fragmentary sectional view, taken generally along the line 3—3 of FIG. 2, illustrating the construction of an actuator which moves an end portion of a spring in the lash adjustment assembly into engagement with a threaded member in the lash adjustment assembly upon turning of steerable vehicle wheels.

Although the actuator 88 has been illustrated in FIG. 3 as being integrally formed as one piece with the end wall 36 of the housing 30, the actuator 88 could be formed separately from the housing if desired. For example, the cam surface 96 could be formed on a circular disk separately from the housing 30. The circular disk would then be fixedly connected with the end wall 36 of the housing 30.

The head end portion 62 (FIG. 2) of the threaded force transmitting member 60 is held against movement along the axis 24 by the housing 30. In the illustrated embodiment of the invention, the head end portion 62 of the threaded force transmitting member 60 is received in a cylindrical recess 118 formed in the housing 30. The left (as viewed in FIG. 2) end surface 120 of the head end portion 62 is pressed against a flat side surface of the actuator 88.

A thrust bearing 124 is disposed between an annular end surface 126 on the head end portion 62 of the threaded force transmitting member 60 and an annular washer 128. A threaded plug member 132 is engaged by the annular washer. The threaded plug member 132 presses the washer 128 against the thrust bearing 124 to clamp the head end portion 62 in place between the plug member 132 and the actuator 88.

A second thrust bearing (not shown) may be provided if desired between the head end portion 62 of the threaded force transmitting member 60 and the actuator 88. However, since the reaction forces between the sector gear 16 and the threaded force transmitting member 60 urge the threaded force transmitting member axially toward the right (as viewed in FIG. 2), it is believed that it may be preferred to only use a single thrust bearing 124.

Although the head end portion 62 of the threaded force transmitting member 60 is held against movement along the axis 24, the threaded force transmitting member 60 is rotatable about the axis 24. When the steerable vehicle wheels are in an on-center or straight-ahead initial condition, the spring 72 is effective to transmit force between the housing 30 and the threaded force transmitting member 60. This force urges the threaded force transmitting member 60 to rotate in the direction of the arrow 84 in FIG. 2. Therefore, the sector gear 16 is urged toward the left (as viewed in FIG. 2) to eliminate backlash between the sector gear and the rack gear 14.

In the embodiment of the invention illustrated herein, the recesses 102 are formed in the head end portion 62 of the threaded force transmitting member 60. The recesses 102 have longitudinal central axes which extend parallel to the central axis 24 of the threaded force transmitting member 60. The longitudinal central axes of the straight recesses 102 in the head end portion 62 of the threaded force transmitting member 60 extend parallel to the longitudinal central axis of the second end portion 76 of the spring. It should be understood that the recesses 102 could be formed in a different portion of the threaded force transmitting member 60 if desired. For example, the recesses 102 could be formed in the shank portion 64 of the threaded force transmitting member 60.

When the backlash adjustment assembly 46 is to be positioned in the housing 30, the threaded force transmitting member 60 is initially mounted on the end wall 36. The head end portion 62 of the threaded force transmitting member 60 is disposed in the recess 118. The spring 72 is mounted on the threaded force transmitting member 60, in the manner shown in FIG. 2. At this time, the shank portion 64 and the external thread convolution 66 are axially spaced from the sector gear 16.

A tool is then inserted through an opening 140 in the plug member 132 into a hexagonal socket 142 formed in the head end portion 62 of the threaded force transmitting member 60. The tool is rotated relative to the end wall 36 in a direction opposite to the arrow 84 (FIG. 2). This rotates the threaded force transmitting member 60 in a direction opposite to the arrow 84 to resiliently deflect the turns 78 of the spring 62. As this occurs, the coils 78 are resiliently deflected to store energy.

While the tool is utilized to hold the threaded force transmitting member 60 against rotation relative to the end wall 36, the entire end wall and the threaded force transmitting member 60 are rotated about the axis 24. At the same time, the external thread convolution 66 on the threaded force transmitting member 60 is moved axially into threaded engagement with the internal thread convolution 68 on the sector gear 16. This results in movement of the threaded force transmitting member 60 and end wall 36 to the position shown in FIG. 1.

The tool is then withdrawn from the socket 142 to release the threaded force transmitting member 60 for rotation relative to the sector gear 16 and housing 30 under the influence of force applied against the threaded force transmitting member by the resiliently deflected spring 72.

When the threaded force transmitting member 60 is initially positioned in the apparatus 10, there is little or no clearance between the teeth 18 of the sector gear 16 and the teeth 20 of the rack gear 14. Therefore, the spring 72 is ineffective to rotate the threaded force transmitting member 60 relative to the housing 30 and sector gear 16.

During subsequent use of the apparatus 10, clearance will develop between the teeth 18 of the sector gear 16 and the teeth 20 of the rack gear 14. When this occurs, the resiliently deflected spring 72 slightly unwinds to rotate the threaded force transmitting member 60 in the direction of the arrow 84 in FIG. 2. This causes the external thread convolution 66 on the threaded force transmitting member 60 to cooperate with the internal thread convolution 68 on the sector gear 16 to move the sector gear toward the left (as viewed in FIG. 1) along the axis 24 and eliminate the clearance.

From the above description of the invention, those skilled in the art will perceive improvements, changes and modifications. Such improvements, changes and modifications within the skill of the art are intended to be covered by the appended claims.

Having described the invention, the following is claimed:

1. A vehicle steering apparatus comprising:

a first gear which is rotatable about an axis;

a second gear having gear teeth in meshing engagement with gear teeth on said first gear; and adjustment means for moving said first gear in one direction along said axis to reduce clearance between said meshing gear teeth, said adjustment means including:

a threaded member having a threaded connection with said first gear centered on said axis;

means fixing said threaded member against movement along said axis and enabling rotation of said member about said axis, rotation of said member causing movement of said first gear along said axis in said one direction;

a torsion spring for rotating said threaded member about said axis, said torsion spring having a first end connected to said threaded member and a second end; and a cam for moving said second end of said torsion spring between a first position in which said torsion spring acts to rotate said threaded member and a second position in which said torsion spring does not act to rotate said member.

2. Apparatus as set forth in claim 1 wherein said gears have a neutral position and operating positions and further including a housing for said first and second gears, said cam comprising a cam surface of said housing, said second end of said torsion spring being biased against said cam surface.

3. Apparatus as set forth in claim 2 wherein said cam surface includes a first portion defining a recess in said housing in which said second end is located when said gears are in the neutral position to enable said torsion spring to act between said housing and said threaded member to cause movement of said first gear along said axis when said gears are in the neutral position.

4. Apparatus as set forth in claim 3 wherein said cam surface includes second and third surface portions on opposite sides of said first surface portion for moving said second end of said torsion spring into a recess on said threaded member when said gears are not in the neutral position to cause both ends of said torsion spring to act on said threaded member in opposite directions.

5. A apparatus for use in turning steerable wheels of a vehicle, said apparatus comprising:

a first gear;

a second gear having teeth in meshing engagement with said first gear;

a housing at least partially enclosing said first and second gears;

a threaded member having a threaded connection with said first gear;

a spring, said spring having a first end portion connected with said threaded member, said spring having a second end portion movable between an active condition in which said second end portion of said spring is effective to transmit force to said housing to enable said spring to urge said threaded member to rotate relative to said first gear and an inactive condition in which said second end portion of said spring is effective to transmit force to said threaded member and said spring is ineffective to urge said threaded member to rotate relative to said first gear; and an actuator which engages said second end portion of said spring and is effective to move said second end portion of said spring from the active condition to the inactive condition upon turning of the steerable vehicle wheels.

6. An apparatus as set forth in claim 5 wherein said threaded member has a head portion and a shank portion with an external thread convolution which engages an internal thread convolution on said first gear, said actuator being effective to move said second end portion of said spring into engagement with said head portion of said threaded member upon movement of said second end portion of said spring from the active condition to the inactive condition during turning of the steerable vehicle wheels.

7. An apparatus as set forth in claim 5 wherein said actuator includes a cam surface which is fixedly connected with said housing and which engages said second end portion of said spring to move said second end portion of said spring into engagement with said threaded member upon movement of said second end portion of said spring from the active condition to the inactive condition during turning of the steerable vehicle wheels.

8. An apparatus as set forth in claim 5 wherein said spring includes a plurality of turns which are coiled around and are disposed in a coaxial relationship with said threaded member, said plurality of turns being disposed between said first and second end portions of said spring.

9. An apparatus as set forth in claim 8 wherein said actuator includes a surface which engages said second end portion of said spring and moves said second end portion of said spring toward a longitudinal central axis of said plurality of turns upon movement of said second end portion of said spring from the active condition to the inactive condition during turning of the steerable vehicle wheels.

10. An apparatus as set forth in claim 5 wherein said threaded member includes a plurality of recesses, said actuator being effective to move said second end portion of said spring into one of said recesses upon movement of said second end portion of said spring from the active condition to the inactive condition during turning of the steerable vehicle wheels.

11. An apparatus as set forth in claim 5 wherein said actuator includes a first surface which at least partially defines a recess which is spaced a first distance from a central axis of said threaded member and a second surface which has an arcuate configuration with a center of curvature disposed on the central axis of said threaded member, said second end portion of said spring being disposed in said recess in engagement with said first surface of said actuator when said second portion of said spring is in the active condition, said second end portion of said spring being moved into engagement with and being movable along said second surface of said actuator upon movement of said second end portion of said spring from the active condition to the inactive condition and turning of the steerable vehicle wheels.

12. A apparatus for use in turning steerable wheels of a vehicle, said apparatus comprising:

a first gear;

a second gear having teeth in meshing engagement with said first gear;

a housing at least partially enclosing said first and second gears, said first gear being rotatable relative to said housing upon turning of the steerable vehicle wheels;

a threaded member having a threaded connection with said first gear, said threaded member including a head end portion and a shank portion which extends axially outward from said head end portion, said head end portion including a plurality of recesses disposed in an array around said head end portion, said shank portion including an external thread convolution which engages an internal thread convolution connected with said first gear, said threaded member being held against movement relative to said housing along a central axis of said threaded member, said threaded member being rotatable relative to said housing about the central axis of said threaded member upon turning of the steerable vehicle wheels;

a spring, said spring having a first end portion connected with said shank portion of said threaded member, said spring having a second end portion disposed adjacent to said head end portion of said threaded member, said spring having a plurality of turns which are coiled around said shank portion of said threaded member and are disposed between said first and second end portions of said spring; and a cam surface which is fixedly connected with said housing and moves said second end portion of said spring from a location spaced from said recesses in said head end portion of said threaded member into one of said recesses in said head end portion of said threaded member upon turning of the steerable vehicle wheels.

* * * * *